(12) United States Patent
Fourcroy et al.

(10) Patent No.: US 6,419,425 B1
(45) Date of Patent: Jul. 16, 2002

(54) GRANULAR MATERIAL DISTRIBUTING APPARATUS COMPRISING AT LEAST TWO TRANSFER VESSELS THAT OPERATE IN ALTERNATION

(75) Inventors: Jean-Pierre Fourcroy, Leers; Patrick De Cauwer, Comines; Yves Renaudin, La Madeleine, all of (FR)

(73) Assignee: Neu Transf'air, Marcq en Baroeul (FR)

( * ) Notice: Subject to any disclaimer, the term of this patent is extended or adjusted under 35 U.S.C. 154(b) by 0 days.

(21) Appl. No.: 09/796,118

(22) Filed: Feb. 28, 2001

(51) Int. Cl.$^7$ .............................................. B65G 53/36
(52) U.S. Cl. .......................... 406/120; 406/23; 406/32; 406/145; 406/146
(58) Field of Search ........................... 406/23, 32, 120, 406/145, 146

(56) References Cited

U.S. PATENT DOCUMENTS

| | | | | |
|---|---|---|---|---|
| 3,689,045 A | * | 9/1972 | Coulter et al. | 266/28 |
| 4,116,367 A | * | 9/1978 | Kataoka et al. | 222/144.5 |
| 4,345,858 A | * | 8/1982 | Barlow | 406/34 |
| 4,381,897 A | * | 5/1983 | Arbeletche et al. | 406/93 |
| 4,697,962 A | * | 10/1987 | Dunbar et al. | 406/15 |

FOREIGN PATENT DOCUMENTS

EP 0 561 679 B1 9/1993

* cited by examiner

Primary Examiner—Christopher P. Ellis
Assistant Examiner—Joe Dillon, Jr.
(74) Attorney, Agent, or Firm—Weingarten, Schurgin, Gagnebin & Lebovici LLP (57) ABSTRACT

Apparatus for distributing granular material, in particular sand, the apparatus comprising:

a) a portable distribution head;

b) a flexible hose for transferring the material to the portable head;

c) a main feed duct for feeding material from a storage vessel;

d) a main suction duct associated with the flexible hose for sucking dust from the portable head;

e) a plurality of n transfer vessels suitable for being fed with material from the main feed duct and for delivering the material to the portable distribution head;

f) sets of multiple connections enabling the distribution head to receive material from a selected vessel and at least one other vessel to be fed simultaneously with the material; and g) control means for obtaining substantially continuous operation of the distribution head by controlling changeovers between the vessels which are caused to operate in alternation.

14 Claims, 4 Drawing Sheets

GRANULAR MATERIAL DISTRIBUTING APPARATUS COMPRISING AT LEAST TWO TRANSFER VESSELS THAT OPERATE IN ALTERNATION

The present invention relates to an operator distributing a granular material, in particular sand, from a fixed workstation. In particular, it relates to filling the bunkers, commonly known as "sand boxes" that are provided on trains and trams. More precisely, the invention relates to apparatus for filling said sand boxes from a fixed workstation referred to as a "sand point", while the boxes lie within a determined area surrounding said workstation.

BACKGROUND OF THE INVENTION

Apparatus of the sand point type for distributing granular material is known, in particular from document EP 0 561 679, said apparatus having a transfer vessel for containing the material and a portable distribution head which is connected via a flexible hose to the transfer vessel, which vessel is fed with compressed air under pressure.

Such apparatus is generally part of a distribution installation having a plurality of fixed workstations, said installation also including a storage silo which is connected to and fills a plurality of storage vessels, each storage vessel being itself connected to and feeding a plurality of sand point type apparatuses as described above. The storage vessels and the sand point apparatuses can be placed on the ground, can possibly be buried, or they can be situated on raised gangways or supports.

When one or more trains are situated in the area situated close to a sand point, an operator fills the various sand boxes that are to be found in said zone by moving the distribution head of the sand point from one sand box to another. Nevertheless, this operation is restricted by the capacity of the transfer vessel of the sand point. When the level of sand in the vessel reaches a determined low threshold, sand can no longer be distributed properly to the distribution head so it becomes essential to interrupt the operation for the time required to fill the transfer vessel with sand coming from a storage vessel. This difficulty is of little importance when filing sand boxes of small capacity. However, it becomes unacceptable in countries where sand boxes are of larger capacity or where the number of sand boxes accessible from a given sand point is also large.

Naturally, to mitigate such a difficulty, it would suffice to increase the capacity of the sand point transfer vessel. Nevertheless, such an increase gives rise to other difficulties, in particular it is difficult to obtain continuous transfer without the sand jolting in the transfer hose connecting the transfer vessel to the portable distribution head. The greater the sand capacity of the transfer vessel, the greater the difficulty in controlling the compressed air pressure and flow rate conditions so as to obtain transfer under acceptable conditions of safety for the operator. In addition, in the event of an accident, e.g. the vessel being empty of sand and under air pressure because the low level was not detected, the discharge of air under pressure from the vessel presents risks of injuring the operator by a phenomenon identical to that of compressed air expanding in a hose that is not properly maintained. The greater the volume of the vessel, the higher the risk.

OBJECTS AND SUMMARY OF THE INVENTION

The object the Applicant seeks to achieve is to mitigate those drawbacks.

This object is fully achieved by the apparatus of the invention. The invention provides apparatus for distributing granular material, in particular sand, and comprising in a manner known from document EP 0 561 679:

a) a portable distribution head;

b) a flexible hose for transferring the material to the portable head;

c) a main feed duct for feeding material from a storage vessel; and d) a main suction duct associated with the flexible hose for sucking dust from the portable head.

In a manner characteristic of the invention, the apparatus also comprises:

e) a plurality n of transfer vessels, each vessel:
   being fed with material via a secondary feed duct fitted with a valve;
   receiving, filtering, and exhausting suction air coming from the portable head via a secondary suction duct fitted with a valve;
   delivering the material via a secondary delivery duct fitted with a valve; and
   also being fitted with two sensors for sensing the level of the material, a high sensor and a low sensor;

f) three sets of multiple connections, the first set connecting the n secondary feed ducts to the main feed duct, the second set connecting the n secondary suction ducts to the main suction duct, and the third set connecting the n secondary delivery ducts to the transfer hose; and g) control means connected to $3n$ valves and to the $2n$ level sensors, said means being programmed to make it possible to obtain substantially continuous operation of the distribution head based on alternating operation of the n transfer vessels by a changeover effect whereby one vessel is emptying while at least one other vessel is filling.

The number n of transfer vessels is generally two, or possibly three.

With two transfer vessels, operation takes place completely continuously with filling of a transfer vessel being transparent to the operator, providing, in operation, the rate material is fed to the vessel being filled is not less than the rate at which material is being removed via the distribution head. Nevertheless, even if this condition is not complied with in full, a combination of two transfer vessels of smaller volume operating in alternation makes it possible to work with a volume of material which is always greater than twice the capacity of two of said vessels.

In practices when the material drops below the threshold corresponding to said level, it is the low level sensor of the vessel that is being emptied which serves to trigger changeover of the control means causing firstly the distribution head to be fed from the other vessel and secondly the emptied vessel to be refilled. The high level sensor causes the valve in the secondary feed pipe-of the corresponding vessel to be closed once the material has reached the determined high level. An apparatus with two transfer vessels each having a volume of about 200 liters has been found to be sufficient for filling the sand boxes of locomotives of the type developed in North America which have a capacity of more than 700 liters, with two sand boxes at the front and one sand box at the rear of the locomotive, each sand box generally needing to be filled with half its capacity on each operation.

To minimize the amount of space occupied on the platform, the n secondary feed ducts, the n secondary suction ducts, the n secondary delivery ducts, the three multiple connection assemblies, the 3n valves, and the control means are preferably placed in a housing structure extending between the n transfer vessels, said vessels preferably being in the form of vertical axis cylinders.

Advantageously, the housing structure comprises a central post terminated by a substantially horizontal arm which supports the hose, which is pivotally mounted, and which has its free end situated perceptibly beyond the transfer vessels.

Another difficulty lies in the length of certain locomotives which can be as much as 25 meters (m) long, thus making it necessary to increase the length of the hose connecting the transfer vessel to the distribution head.

Another difficulty lies in the fact that in certain locomotives, particularly in North America, the inlet orifice to the sand box is not disposed on the side adjacent to the platform at man height, but is high up, requiring filling to be performed vertically.

Another object the Applicant seeks to achieve is to mitigate the above-mentioned difficulties. This object is fully achieved by a variant embodiment of the invention in which the secondary delivery duct is connected to the corresponding transfer vessel at the top thereof, via a delivery tube which penetrates obliquely into the inside of the vessel and whose open end is situated near the bottom thereof.

The transfer vessel is optionally fitted with additional air feed means close to said end of the tube. Thus, the additional air which is fed towards the end of the delivery tube fluidizes to some extent the material in the vicinity of the orifice of the tube corresponding to said end, thereby decompacting said material and facilitating transfer thereof into the tube even though the tube extends towards the top of the vessel. This additional air feed makes it possible to restrict the pressure of compressed air inside the transfer vessel to a maximum of 2 bars. Furthermore, when the connection between the hose and the transfer vessel takes place high up, via the second end of the tube that extends out from the vessel, then the length required for said hose is reduced when it comes to filling sand boxes having their filling orifices likewise situated high up.

For example, the delivery tube can be double-walled and the additional air feed can take place via the annular space between the two walls.

The suction air coming from the portable head is delivered into one of the transfer vessels via a secondary suction duct, and it is filtered and then exhausted in that vessel. In a particular disposition of the invention, the particles contained in the suction air coming from the portable head are recycled inside the transfer vessel into the granular material that is to be distributed. To obtain this result, the transfer vessel has a top filter compartment within which a filter is placed; the bottom of said filter compartment has a conical collector with a central outlet orifice that is fitted with a valve. In addition, the secondary suction duct opens out into the top filter compartment in the zone outside the filter while an air removal duct opens out into the zone inside the filter. When the transfer vessel is in operation, the valve closes the central orifice of the conical collector. The pressure that exists inside the transfer vessel is high enough to cause the granular material to be transferred via the secondary delivery duct. The air which is sucked in from the portable head passes through the filter before being removed to the outside of the transfer vessel. Dust contained in said sucked-in air is retained by the filter. When delivery of material from the transfer vessel is halted, particularly under the action of the low sensor, the valve fitted to the orifice of the conical collector opens, putting the top filter compartment of the transfer vessel into communication with the bottom compartment containing the granular material. During filling, following delivery, it is possible to proceed with unclogging sequences, each sequence consisting in rapidly opening a valve putting the inner zone of the filter into communication with a small supply of compressed air raised to a pressure of about 5 bars to 7 bars. This brief injection of compressed air serves to detach the particles held on the outer surface of the filter. Said particles then fall into the conical collector, pass through the open central orifice of said collector, and drop into the bottom compartment containing the granular material.

It is essential to avoid sudden decompression inside the transfer vessel since such decompression would run the risk of bursting the filter. For this purpose, it is preferable to use a solenoid valve which opens progressively, or indeed a decompression bypass or a calibrated orifice.

BRIEF DESCRIPTION OF THE DRAWINGS

The present invention will be better understood on reading the following description of two embodiments of apparatus for dispensing sand, the apparatus having two transfer vessels in the first embodiment and three transfer vessels in the second embodiment, and being illustrated in the accompanying drawings, in which.

MORE DETAILED DESCRIPTION

The sand point 1 is intended to enable an operator 2 to distribute a granular material, and specifically sand for filling sand boxes, i.e. bunkers that are provided in trains 3.

Figures 2, 5:
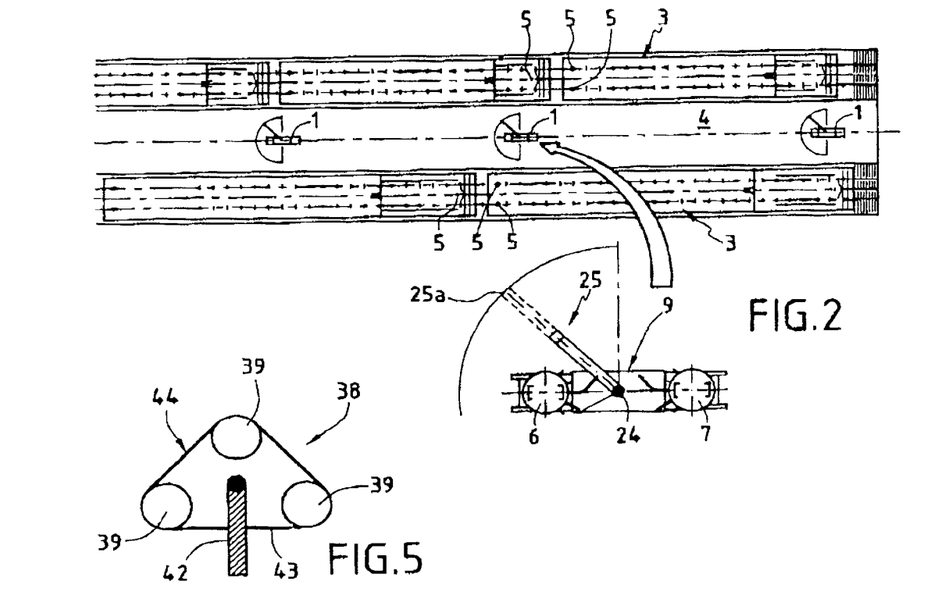
FIG. 2 is a plan view of a platform fitted with a plurality of first embodiment apparatuses, with two trains standing on either side of the platform.
FIG. 5 is a plan view of a second-embodiment apparatus having three transfer vessels.

On a platform 4 that is specially provided for this purpose, a succession of sand points 1 are located at more or less regular intervals, each sand point enabling the operator 2 to fill sand boxes that are located nearby, for example the central sand point 1 in FIG. 2 enables the operator 2 to fill six sand boxes whose filler orifices 5 are situated at the top of each compartment of the train, respectively one at the front and two at the rear of each compartment.

A prior art sand point is known in particular from document EP 0 561 679. In such a sand point, a portable distribution head is connected by a hose to a transfer vessel, which vessel contains sand and is fed with compressed air under pressure so as to enable the sand to be moved along the hose to the distribution head. It suffices for the operator to insert the distribution head into the filler orifice of a sand box, and to open the closure system of the head in order to cause sand to be distributed into the sand box. When the level of sand in the transfer vessel reaches a determined threshold, operation of the sand point stops and the transfer vessel is filled with sand from a storage vessel via a main feed duct, until the sand has reached a determined high level. A main dust suction duct is also provided extending from the portable head so as to prevent dust from spreading into the atmosphere through the inlet opening of the sand box while it is being filled. This main suction duct comprises a flexible sheet secured to the hose so as to be easily manipulated by the operator when moving along the platform. The main suction duct is connected to a dust filter system.

The sand point 1 of the invention has all of the items outlined above.

In a manner characteristic of the invention the sand point 1 does not have a single transfer vessel as in the case of document EP 0 561 679, but a plurality of transfer vessels which are arranged in such a manner as to enable the distribution head to operate substantially continuously without requiring it to stop because of a lack of sand. This substantially continuous operation is thus based on alternating operation with changeover between a plurality of transfer vessels, with the transfer vessel that is feeding the distribution head emptying while at least one other vessel is filling.

Figure 1:
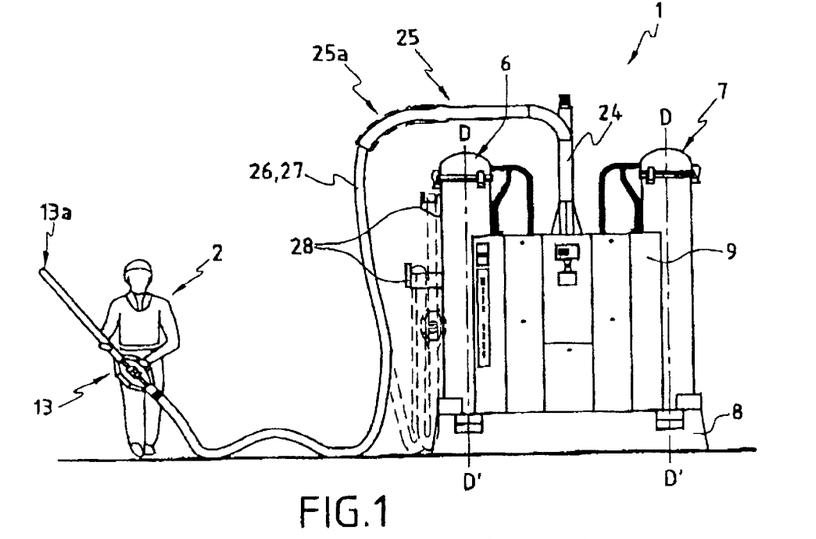
FIG. 1 is an overall view of the first embodiment of apparatus having two transfer vessels, with the portable distribution head shown in the hands of an operator.
Figure 3:
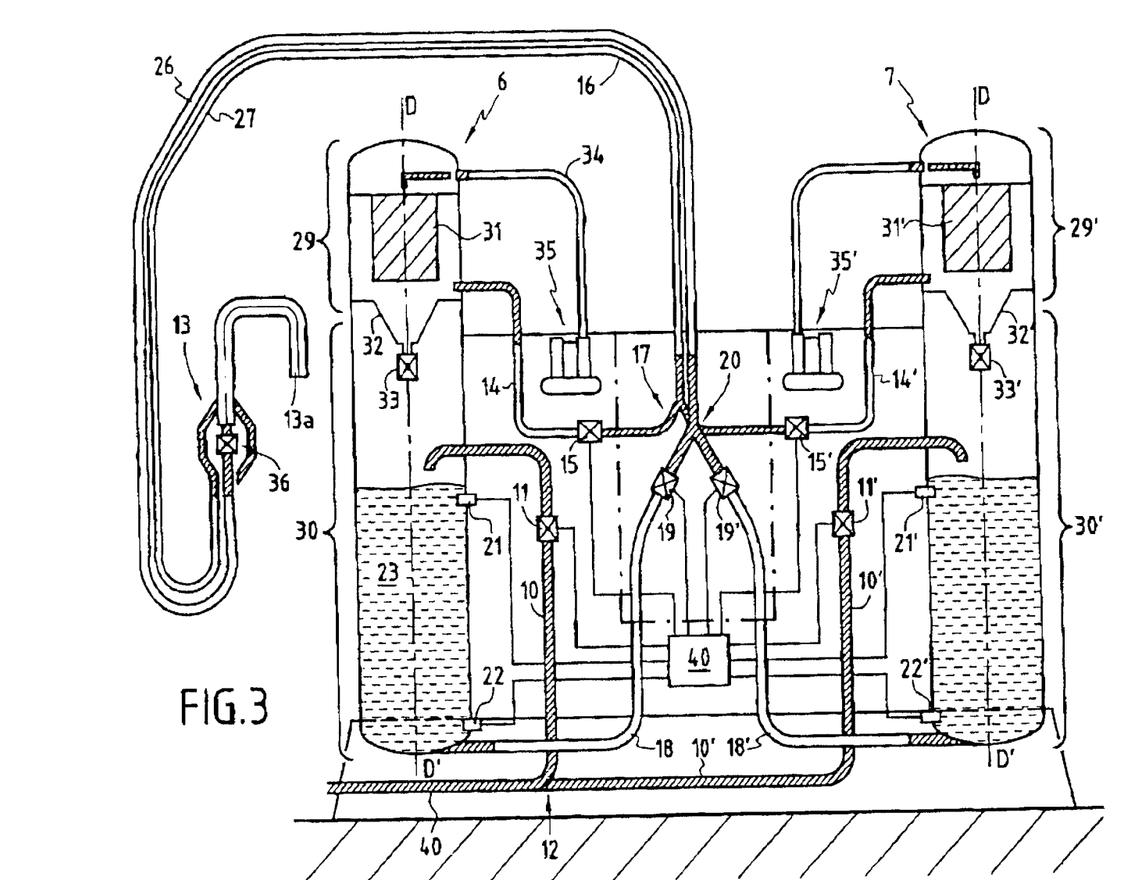
FIG. 3 is a diagram showing how the two-vessel first embodiment operates.

In the first embodiment which is shown in FIGS. 1 to 3, the number n of vessels is two, but the invention is not restricted to that number.

The two vessels 6 and 7 are identical, having the same generally cylindrical shape about respective vertical axes DD'. They are fixed on a stand 8 and they are spaced apart. A frame extends between the two vessels 6 and 7 so as to constitute a housing structure 9 for the set of members that enable the sand point 1 to operate in alternating manner.

Each vessel 6, 7 is fed with sand by means of a secondary feed duct 10, 10' fitted with a valve 11, 11'. The two secondary feed ducts 10, 10' are connected via a multiple connection assembly 12 to the main feed duct 40 coming from the storage vessel (not shown in the figures).

Each transfer vessel 6, 7 is suitable for receiving, filtering, and exhausting the suction air which comes from the portable distribution head 13 via a secondary suction duct 14, 14' fitted with a valve 15, 15', the two secondary suction ducts 14, 14' being connected to the main suction duct 16 via a multiple connection assembly 17.

Each transfer vessel 6, 7 is suitable for delivering sand via a secondary delivery duct 18, 18' fitted with a valve 19, 19', the two secondary delivery ducts 18, 18' being connected to the hose 26 for transferring sand to the distribution head 13 via a multiple connection assembly 20.

Each vessel 6, 7 has sand level sensors provided therein: a high sensor 21, 21' and a low sensor 22, 22' Six valves 11 & 11', 15 & 15', and 19 & 19', and the four level sensors 21 & 21' and 22 & 22' are connected to control means 40, which control means 40 are programmed to implement alternating operation by switching over between the two transfer vessels 6, 7 so as to enable the distribution head 13 to operate in substantially continuous manner, i.e. so that its operation does not cause sand distribution to stop when the vessel feeding the distribution head 13 has emptied out its sand 23. This alternating operation is described in greater detail below.

As can be seen more clearly from FIG. 1, the sand point 1 includes a post 24 which is disposed centrally in the inside space of the housing structure 9. The top of this post is terminated by an arm 25 mounted to pivot about said post 24 and supporting the hose 26 for transferring sand to the distribution head 13, and also supporting the sheath 27 acting as the main auction duct for dust 16 This arm 25 extends laterally over the transfer vessels 6, 7. When the arm 25 pivots on the post 24, the free end 25a of the arm 25 describes a circle or a portion of a circle whose radius is greater than the distance between the vertical axis of the post 24 and the wall of either of the transfer vessels 6, 7 where it is at its furthest from the post 24. This outer wall of one of the vessels 6, 7 is preferably provided with means 28 for carrying the portable distribution head 13 and those portions of the hose 26 and the main suction duct 27 which extend beyond the free end 25a of the arm 25. The advantage of these particular dispositions can be seen very clearly on examining FIGS. 1 and 2. When the sand point 1 is not in use, the hose 26 and the main suction duct 27 are wound on the transfer vessel 6 and the distribution head 13 is suspended from said carrier means 28. To start operation, the operator 2 takes the distribution head 13 and unwinds the hose 26 and the associated main suction duct 27 so as to release a sufficient length of said hose to reach the orifice 5 of the sand box that is to be filled with sand. It is also very easy to go round the sand point 1 by the arm 25 pivoting so as to move the distribution head 13 throughout the area surrounding the sand point 1.

Figure 4:
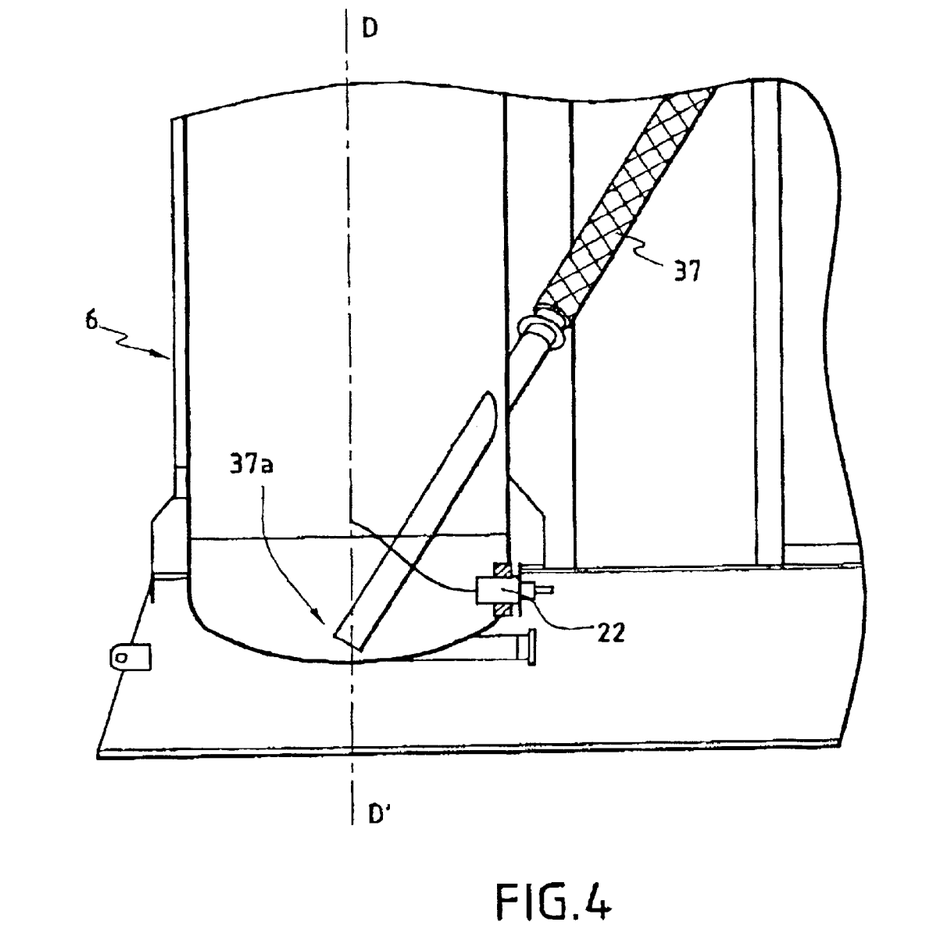
FIG. 4 is a fragmentary longitudinal section of a preferred first-embodiment apparatus having two transfer vessels.

On the inside, each vessel 6, 7 has a top filter compartment 29, 29' and a bottom compartment 30, 30' for receiving sand.

The top filter compartment 29 is fitted on the inside with a filter 31 made of conventional filter material. In the example shown in FIG. 4, the filter material has an annular configuration centered on the axis DD' of the transfer vessel 6 and with an outside diameter that is less than the inside diameter of the vessel.

The bottom of the top filter compartment 29 is formed by a conical collector 32 likewise centered on the axis DD' of the vessel, and terminated by a through orifice (not shown in the figures), said orifice being associated with a valve 33 suitable for opening it or closing it. When the valve 33 is closed, the top filter compartment 29 is hermetically separated from the bottom compartment 30.

The secondary suction duct 14 opens out into the bottom portion of the filter compartment 29. After passing through the filter 31, the suction air cleaned of its dust is removed from the filter compartment 29 via an air removable duct 34 situated in the top of the filter compartment 29 above the filter 31. It should be observed that the filter 31 is fixed inside the filter compartment 29 in such a manner that all of the air coming from the secondary auction duct 14 passes through said filter 31 prior to being removed via the air removal duct 34.

In practice, air suction is provided at the distribution head 13 by means of a fan 35 whose operating conditions enable it to generate a pressure drop that is sufficient to establish said suction successively via the air removal duct 34, the top filter compartment 29 including its filter 31, the secondary suction duct 14, the main suction duct 27, and the portable distribution head 13.

The sand point 1 operates under the following conditions. One of the two transfer vessels 6, 7, e.g. the first vessel 6, is in operation with the sand 23 filling its bottom compartment 30 up to the level of the high sensor 21, said bottom compartment 30 being under pressure from a compressed air feed (not shown) at a pressure of about 1.2 bars to 2 bars. The valves 15 and 19 respectively on the secondary suction duct 14 and on the secondary delivery duct 18 are open while the valves 11 and 36 respectively on the secondary feed duct 10 and on the distribution head 13 are closed. After taking the distribution head 13 down from the carrier means 28, the operator places the end 13a of said head 13 in the filler opening 5 of the sand box to be filled. The operator then actuates the system for closing the distribution head 13 so as to open the valve 36. Under the pressure that exists inside the bottom compartment 30 of the vessel 6, the sand 23 is urged to rise inside the secondary delivery duct 18 and then the hose 26 to the end 13a of the distribution head 13, from which it penetrates into the sand box and fills it. At the same time, the air surrounding the distribution head 13 is sucked into the main suction duct 27 and along the secondary suction duct 14 so as to penetrate into the top filter compartment 29. This air passes through the filter 31 which retains the dust and then leaves via the removal duct 34 so as to be exhausted into the atmosphere via the fan 35. While this operation is taking place, the two compartments 29 and 30 of the transfer vessel are isolated from each other since the valve 33 is closed. The bottom compartment 30 is at a positive pressure of about 1.2 bars to 2 bars while the top filter compartment 29 is at a negative pressure. During this time, the valve 11' of the secondary feed duct 10' of the second vessel 7 is open so that said coming from the storage vessel can be fed into the bottom compartment 30' of said second vessel 7 and fill it up to the level of the high sensor 21'.

While the sand box is being filled, the level of sand 23 in the first transfer vessel 6 moves down until it reaches the low sensor 22 which has the effect of changing over so that the second transfer vessel 7 operates in the manner described above for the first vessel 6, and thus inverting the valves and the compressed air feed. Sand from the second vessel 7 is then fed to the hose 26 so as to reach the distribution head 13 and the changeover between the two vessels 6, 7 is implemented in such a manner as to ensure that there is no significant interruption in the delivery of sand to the distribution head 13.

After changeover, the first vessel 6 needs to be refilled with sand until the sand reaches the level of its high sensor 21. Nevertheless, sand can be injected via the secondary feed duct 10 through the valve 11 under good conditions, only if the pressure that exists inside the bottom compartment 30 of the transfer vessel 6 has returned to atmospheric pressure. For this purpose, and preferably before changeover, the valve 33 is opened progressively, thus interconnecting the top and bottom compartments 30 and 29 so as to release the pressure in the bottom compartment 30. Too sudden a drop in pressure could cause the filter material constituting the filter 31 to burst. It is therefore necessary to use either a solenoid valve that opens progressively or else a decompression bypass or indeed a calibrated orifice. During this filling stage, the control means 40 can also trigger sequences for unclogging the filter 31, e.g. at a frequency of about 20 seconds. A sequence consists in quickly opening a valve that puts the zone inside the filter 31 in the top filter compartment 29 into communication with a small supply of compressed air raised to the pressure of 5 bars to 7 bars. This brief injection of compressed air has the effect of dislodging the dust cake that may have formed on the outside surface of the filter 31. Said dust drops from the filter 31 and is recovered in the collector cone 32, so that since the valve 33 is open it drops into the bottom compartment 30. Dust sucked in through the distribution head 13 is thus continuously recycled.

It will be understood that in order to obtain continuous operation of the distribution head 13 during changeover, it is necessary for a given transfer vessel to be filled substantially more quickly than the other transfer vessel is emptied so that there is enough time for the pressure inside the recently filled vessel to be raised so as to enable sand delivery to take place immediately after changeover.

In the diagram of FIG. 3, the secondary sand delivery duct 18 opens out into the bottom of the transfer vessel 6.

The variant embodiment shown in FIG. 4 differs in that the secondary delivery duct is constituted by a delivery tube 37 which extends obliquely and penetrates into the bottom compartment 30 of the vessel so that its open end 37a is situated close to the bottom thereof on the inside. Compared with the first variant embodiment, this structural disposition makes it possible to use a lower pressure in the bottom compartment 30 to transfer sand into the secondary delivery duct.

In the example of FIG. 4, the delivery tube 37 is at an angle of about 30° relative to the vertical axis DD' of the vessel.

Additional air feed means are optionally provided close to the end 37a of the tube 37. This additional air stirs and possibly even fluidizes to some extent the sand in the vicinity of the tube orifice corresponding to said end 37a, thereby decompacting the sand and making it easier to transfer into the tube. Said tube 37 may optionally be a double-walled tube so that the additional air feed takes place via the annular space between said two walls.

FIG. 5 shows a sand point 38 having three transfer vessels 39 disposed at the vertices of a triangle, with the sides of said triangle being embodied by the housing structure 44 for the sets of pipes, ducts, valves, fans, and programming equipment enabling the sand point 38 to operate appropriately. As in the first embodiment having two vessels, this sand point 38 likewise has a central post 41 with a lateral arm 42 mounted to pivot on the central post and facilitating movement of the portable distribution head throughout the area occupied by the sand point 38. Compared with a two-vessel sand point, this embodiment makes it possible to use vessels of smaller sand capacity while obtaining substantially continuous operation of the distribution head.

Figure 7:
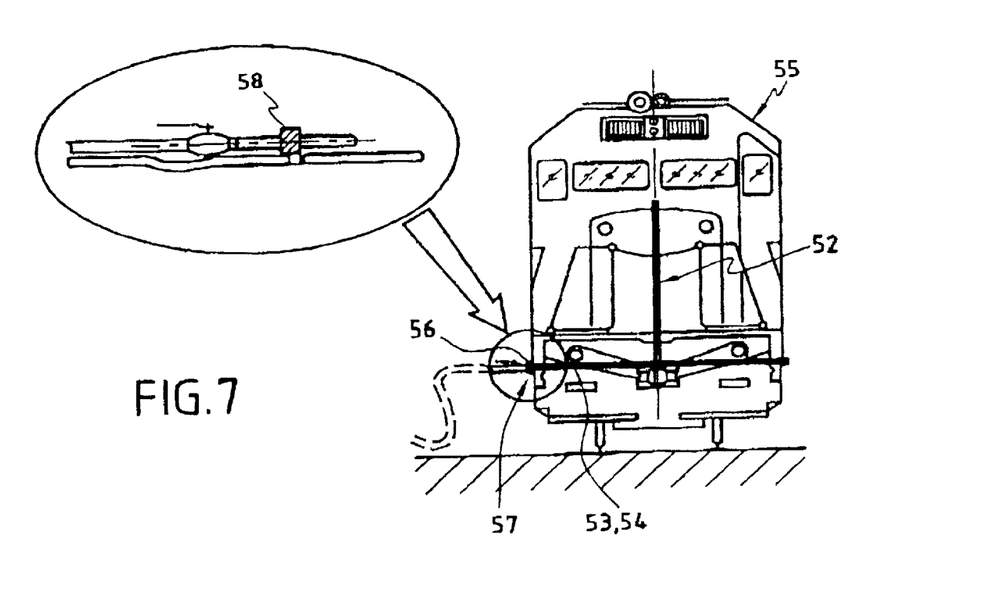
FIG. 7 is a diagrammatic end view of a locomotive fitted with an extender element and a portable distribution head fitted with a coupling member.

In another embodiment in which the sand boxes are not directly accessible at man height but are disposed high up on the locomotives, the recommended solution consists in moving the inlet orifice of the sand box down to man height. To do this, two elements are implemented. The first is an extender element 52 comprising two pipes 53 and 54 that are fixed rigidly on the locomotive 55, one end opening out into the sand box and the other end 56 acting as a filler orifice for filling said sand box. This orifice is at man height and has a first coupling member 57. The second element consists in a second coupling member 58 suitable for co-operating with the first and fixed to the portable distribution head 13. Thus, it suffices for the operator to engage the portable head in the second end 56 of the extender element 52 so as to cause the two coupling members 57, 58 to co-operate with each other. The first pipe 53 of the extender element 52 is for feeding sand while the second pipe 54 is for sucking air. The coupling members 57, 58 are designed so as to put the first pipe into communication with the end of the sand delivery hose and the second pipe into communication with the end of the main dust suction duct.

Figure 6:
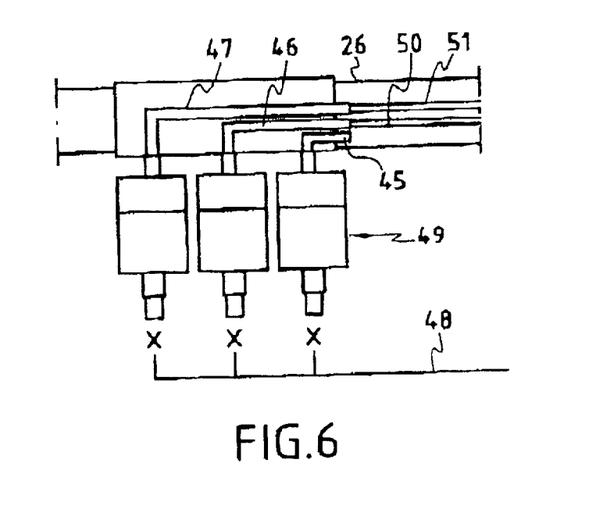
FIG. 6 is a fragmentary diagram of a transfer hose fitted with three air injectors.

Furthermore, when it is desirable to increase the length of the hose collecting the transfer vessel to the distribution head by a significant amount, sand can be transferred under good conditions only by considerably increasing the pressure in the transfer vessel. To mitigate this drawback and thus reduce said pressure while improving the flow rate of sand into the sand box, one solution consists in locally injecting air into the hose along the path of the sand. Such local injections of air serve to aerate the sand and improve transfer along the hose. To do this, air injectors are installed in the hose, and they are preferably fed with compressed air from the transfer vessel. The injectors are advantageously grouped together close to the transfer vessel and likewise flexible hoses of different lengths deliver injection air to the desired locations along the sand delivery hose. For example, a flexible hose 26 has three injectors 45, 46, 47 placed therein and connected to a compressed air feed 48 leading to the transfer vessel via three respective solenoid valves 49. Two of the injectors 46 and 47 are extended by two hoses 50 and 51 made of polyamide known under the trademark Rilsan with an inside diameter of 6 mm and an outside diameter of 8 mm, the two hoses 50 and 51 being of different lengths. For a main sand delivery hose 26 having a length of 15 m, the two hoses 50 and 51 can have respective lengths of 5 m and 10 m. Compressed air is thus injected into the sand flowing along the main hose at three different locations, situated in the vicinity of the inlet to the hose 26 and at distances of 5 m and 10 m therefrom.

What is claimed is:

1. Apparatus for distributing granular materials comprising:
   a) a portable distribution head;
   b) a flexible hose for transferring material to the portable head;
   c) a main feed duct for feeding material from a storage vessel to a transfer vessel; and
   d) a main suction duct associated with the flexible hose for sucking dust from the portable head;
   the apparatus also comprising;
   e) a plurality n of transfer vessels, each vessel:
      being fed with material via a secondary feed duct fitted with a valve;
      adapted for receiving, filterings and exhausting suction air coming from the main suction duct via a secondary suction duct fitted with a valve;
      adapted for delivering the material via a secondary delivery duct fitted with a valve; and
      also being fitted with two sensors comprising a high sensor and a low sensor for sensing the level of the material in the vessel;
   f) three sets of multiple connections, the first set connecting the n secondary feed ducts to the main feed duct, the second set connecting the n secondary suction ducts to the main auction duct, and the third set connecting the n secondary delivery ducts to the hose; and
   g) control means connected to 3 valves and to the 2 level sensors, said means being programmed to make it possible to obtain substantially continuous operation of the distribution head based on alternating operation of the n transfer vessels by a changeover effect whereby one vessel is emptying while at least one other vessel is filling.

2. Apparatus according to claim 1, wherein the number n of transfer vessels is two or three.

3. Apparatus according to claim 1, wherein said granular material is sand.

4. Apparatus according to claim 1, wherein the n secondary feed ducts, the n secondary suction ducts, the n secondary delivery ducts, the three multiple connection sets, the 3 valves, and the control means are placed in a housing structure.

5. Apparatus according to claim 4, wherein the housing structure has a central post terminated by an arm that is substantially horizontal and that supports the hose, which arm is pivotally mounted and has its free end perceptibly beyond the transfer vessels.

6. Apparatus according to claim 1, wherein the hose is fitted with injectors for injecting compressed air into the hose at a plurality of locations along a path of the granular material.

7. Apparatus according to claim 6, wherein the air injectors are grouped together close to the transfer vessel, and wherein some of the injectors are connected to flexible hoses of different lengths.

8. Apparatus according to claim 1, for distributing granular materials, into the sand box of a locomotive, wherein a locomotive is fitted with an extender element consisting in two pipes which are rigidly fixed to the locomotive, one end of each pipe opening out into the sand box and the other end acting as a filler orifice for said sand box being located at man height and carrying a first coupler member, the apparatus including a second coupler member suitable for cooperating with the first and fixed to the portable distribution head.

9. Apparatus according to claim 8, wherein said granular material is sand.

10. Apparatus according to claim 1, wherein each transfer vessel has a top filter compartment having a filter disposed therein, the bottom of said filter compartment comprising a conical collector with a central outlet orifice that is fitted with a valve, and wherein the secondary suction duct opens out into the top filter compartment outside the filter while an air removal duct opens out into the filter.

11. Apparatus according to claim 10, wherein the valve fitting the central orifice of the conical collector is a solenoid valve that opens progressively or is a decompression bypass.

12. Apparatus according to claim 1, wherein each the secondary delivery duct is connected to the corresponding transfer vessel via a rectilinear delivery tube which penetrates obliquely into the inside of the vessel and has its open end situated at the bottom thereof.

13. Apparatus according to claim 12, wherein each transfer vessel is fitted with additional air feed means in the vicinity of the end of the delivery tube.

14. Apparatus according to claim 13, wherein the delivery tube has a double wall and the additional air feed takes place via the annular space between the two walls.

* * * * *

UNITED STATES PATENT AND TRADEMARK OFFICE
CERTIFICATE OF CORRECTION

PATENT NO. : 6,419,425 B1  
DATED : July 16, 2002  
INVENTOR(S) : Jean-Pierre Fourcroy et al.

It is certified that error appears in the above-identified patent and that said Letters Patent is hereby corrected as shown below:

Column 2,  
Line 48, "practices" should read -- practice, --;

Column 6,  
Lines 2 and 48, "auction" should read -- suction --;

Column 9,  
Line 24, "materials," should read -- material, --;  
Line 37, "filterings" should read -- filtering --;  
Line 48, "auction" should read -- suction --;  
Line 50, "3" should read -- 3n --;  
Line 50, "2" should read -- 2n --; and Column 10,  
Line 7, "3" should read -- 3n --.

Signed and Sealed this

Twentieth Day of April, 2004

JON W. DUDAS  
*Acting Director of the United States Patent and Trademark Office*